United States Patent
Line et al.

(10) Patent No.: US 11,225,202 B1
(45) Date of Patent: Jan. 18, 2022

(54) VEHICLE SEAT DISPLAY ASSEMBLY

(71) Applicant: Ford Global Technologies, LLC, Dearborn, MI (US)

(72) Inventors: Johnathan Andrew Line, Northville, MI (US); Kevin Wayne Preuss, Berkley, MI (US); Robert Charles Shipley, Plymouth, MI (US); Anna Frances Hardig Hendrickson, Royal Oak, MI (US); Nicholas Alphonse Billardello, Macomb, MI (US); Deeptej Kudav, Southgate, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/026,370

(22) Filed: Sep. 21, 2020

(51) Int. Cl.
| | |
|---|---|
| *B60R 11/02* | (2006.01) |
| *B60N 2/809* | (2018.01) |
| *B60N 2/58* | (2006.01) |
| *B60R 11/00* | (2006.01) |

(52) U.S. Cl.
CPC ............ *B60R 11/0235* (2013.01); *B60N 2/58* (2013.01); *B60N 2/809* (2018.02); *B60R 2011/005* (2013.01); *B60R 2011/0017* (2013.01)

(58) Field of Classification Search
CPC ............. B60R 11/0235; B60R 11/0229; B60R 11/0241; B60R 11/0252; B60R 2011/0017; B60R 2011/005; B60R 2011/0094; B60R 2011/0015; B60N 2/809; B60N 2/58; B60N 2/882; B60N 2/879; B60N 2/90; B60N 2/815; B60N 2002/905

USPC ............... 297/217.6, 217.3, 218.4, 219.4
See application file for complete search history.

(56) References Cited

U.S. PATENT DOCUMENTS

| | | | |
|---|---|---|---|
| 6,698,832 B2 * | 3/2004 | Boudinot | B60N 2/879 297/217.4 |
| 8,141,948 B2 | 3/2012 | Cassellia et al. | |
| 8,730,413 B2 | 5/2014 | Tranchina | |
| 9,446,719 B2 * | 9/2016 | Lee | B60R 11/0241 |
| 9,452,717 B2 * | 9/2016 | Dry | B60R 11/02 |
| 10,160,362 B2 * | 12/2018 | Harris | B60N 2/815 |
| 2009/0127897 A1 * | 5/2009 | Watanabe | B60R 11/0235 297/188.04 |
| 2011/0155873 A1 * | 6/2011 | Montag | B60R 11/02 248/218.4 |
| 2012/0018471 A1 * | 1/2012 | Guillermo | B60R 11/0235 224/275 |
| 2014/0077539 A1 | 3/2014 | Brawner | |

FOREIGN PATENT DOCUMENTS

EP 1655177 A1 7/2007

* cited by examiner

*Primary Examiner* — Mark R Wendell
(74) *Attorney, Agent, or Firm* — David Coppiellie; Price Heneveld LLP

(57) ABSTRACT

A display assembly for a vehicle seat includes a housing portion that defines a space for receiving a display. The housing portion includes an angled rear wall. A coupling ledge extends from the angled rear wall. The coupling ledge defines a receiving slot within a recess. A coupling extension has a top edge and a bottom edge. The top edge of the coupling extension is coupled to a bottom of the housing portion. A hook is coupled to and extends from an inner surface of the coupling extension. The hook is disposed adjacent to the bottom edge of the coupling extension.

20 Claims, 13 Drawing Sheets

VEHICLE SEAT DISPLAY ASSEMBLY

FIELD OF THE DISCLOSURE

The present disclosure generally relates to a display assembly, and more specifically, to a display assembly for a vehicle seat.

BACKGROUND OF THE DISCLOSURE

Vehicle passengers may desire to watch or listen to information. The vehicle may include a display for conveying information to the passengers.

SUMMARY OF THE DISCLOSURE

According to at least one aspect of the present disclosure, a vehicle seating assembly includes a seatback frame that has a cross member. The cross member defines apertures. A support member is coupled to the seatback frame. A display assembly includes a support frame and a display. The support frame includes a coupling ledge that defines receiving slots and that extends over the cross member and the support member. The support frame includes hooks that extend through the support member and through the apertures defined by the cross member.

According to another aspect of the present disclosure, a vehicle seat display assembly includes a seatback frame that has a cross member that defines apertures adjacent a bottom edge of the cross member. The cross member includes a top surface that defines guide slots. A display assembly includes a support frame that defines a space for receiving a display. Hooks extend from proximate a bottom edge of the support frame. Each hook extends through one of the apertures defined by the cross member. A coupling ledge extends from the support frame and over the top surface of the cross member. The coupling ledge defines receiving slots that vertically align with the guide slots. Guide members extend through the receiving slots of the coupling ledge and the guide slots of the seatback frame to couple the support frame to the seatback frame.

According to another aspect of the present disclosure, a display assembly for a vehicle seat includes a housing portion that defines a space for receiving a display. The housing portion includes an angled rear wall. A coupling ledge extends from the angled rear wall. The coupling ledge defines a receiving slot within a recess. A coupling extension has a top edge and a bottom edge. The top edge of the coupling extension is coupled to a bottom of the housing portion. A hook is coupled to and extends from an inner surface of the coupling extension. The hook is disposed adjacent to the bottom edge of the coupling extension.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the present disclosure will be set forth in the detailed description which follows and will be apparent to those skilled in the art from the description, or recognized by practicing the invention as described in the following description, together with the claims and appended drawings.

Figure 1:
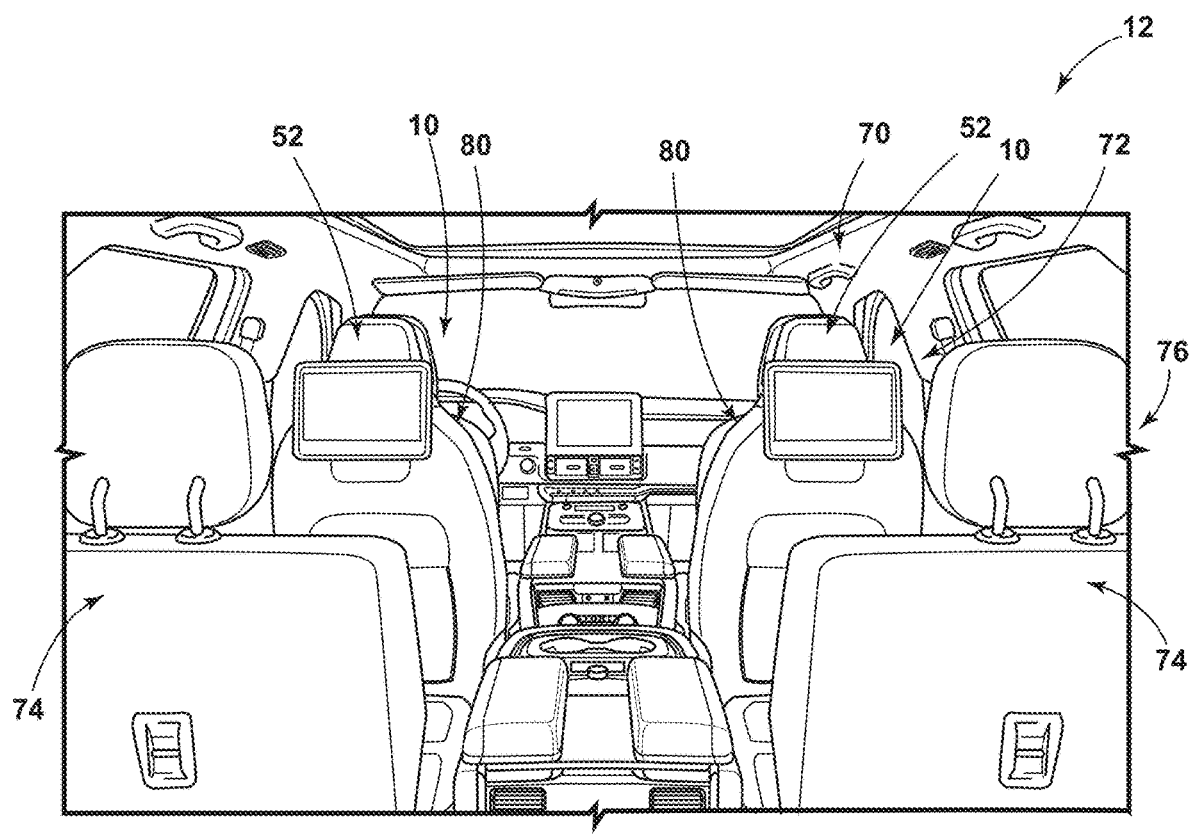
FIG. 1 is a partial rear perspective view of an interior compartment of a vehicle, according to the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone;

A and B in combination; A and C in combination; B and C in combination; or A, B, and C in combination.

For purposes of this disclosure, the term "coupled" (in all of its forms: couple, coupling, coupled, etc.) generally means the joining of two components (electrical or mechanical) directly or indirectly to one another. Such joining may be stationary or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1-13, reference numeral 10 generally designates a seating assembly for a vehicle 12 that includes a seatback frame 14 and a cross member 16. The cross member 16 defines apertures 18, 20. The aperture 18 is horizontally aligned with the aperture 20. A support member 22 is coupled to the seatback frame 14. A display assembly 24 includes a support frame 26 and a display 28. The support frame 26 includes a coupling ledge 30 that defines receiving slots 32, 34. The coupling ledge 30 extends over the cross member 16 and the support member 22. The support frame 26 also includes hooks 36, 38. Each hook 36, 38 extends through the support member 22 and through the respective aperture 18, 20 defined by the cross member 16. Guide members 44, 46 extend through the receiving slots 32, 34 of the support frame 26, the support member 22, and guide slots 48, 50 of the seatback frame 14. A headrest assembly 52 has headrest supports 54, 56. The headrest supports 54, 56 are positioned within the guide members 44, 46.

Referring to FIG. 1, an interior compartment 70 of the vehicle 12 includes two seating assemblies 10 in a first seating row 72 and two seating assemblies 74 in a second seating row 76. The display assemblies 24 are coupled to vehicle-rearward sides of the seating assemblies 10 for viewing by passengers in the vehicle-rearward seating assemblies 74. The seating assemblies 74 are disposed directly behind the seating assemblies 10 to optimize the view of the respective display assembly 24 for the passenger on the seating assembly 74. Each display assembly 24 provides audio and visual information to passengers in specific areas of the vehicle 12, providing personalized communication and entertainment. As illustrated in FIG. 1, the seating assemblies 74 may not include the display assemblies 24. However, it is contemplated that the seating assemblies 74 may include the display assembly 24 if there is an additional seating row within the vehicle 12 disposed rearwardly of the seating assemblies 74.

The vehicle 12 may be a sedan, a sport-utility vehicle, a van, a truck, a crossover, or other styles of vehicle 12. In various examples, the vehicle 12 may be a manually operated vehicle 12 (e.g., with a human driver), a fully autonomous vehicle 12 (e.g., operated with no human driver), or a partially autonomous vehicle 12 (e.g., operated with or without a human driver). Additionally, the vehicle 12 may be utilized for personal or commercial purposes, such as, for ride-providing services (e.g., chauffeuring) or ride-sharing services.

Figure 2:
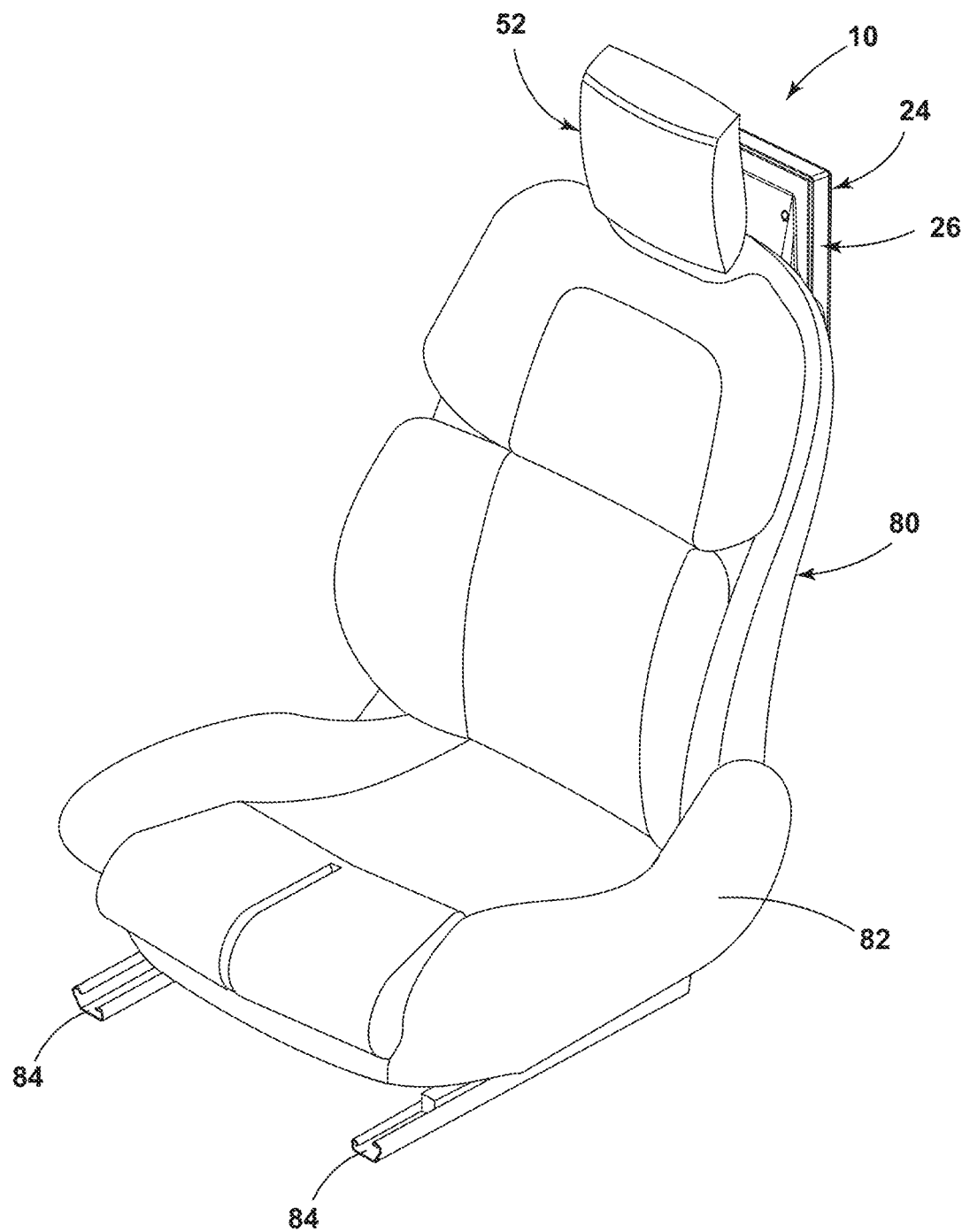
FIG. 2 is a front perspective view of a vehicle seating assembly that includes a display assembly, according to the present disclosure.
Figure 3:
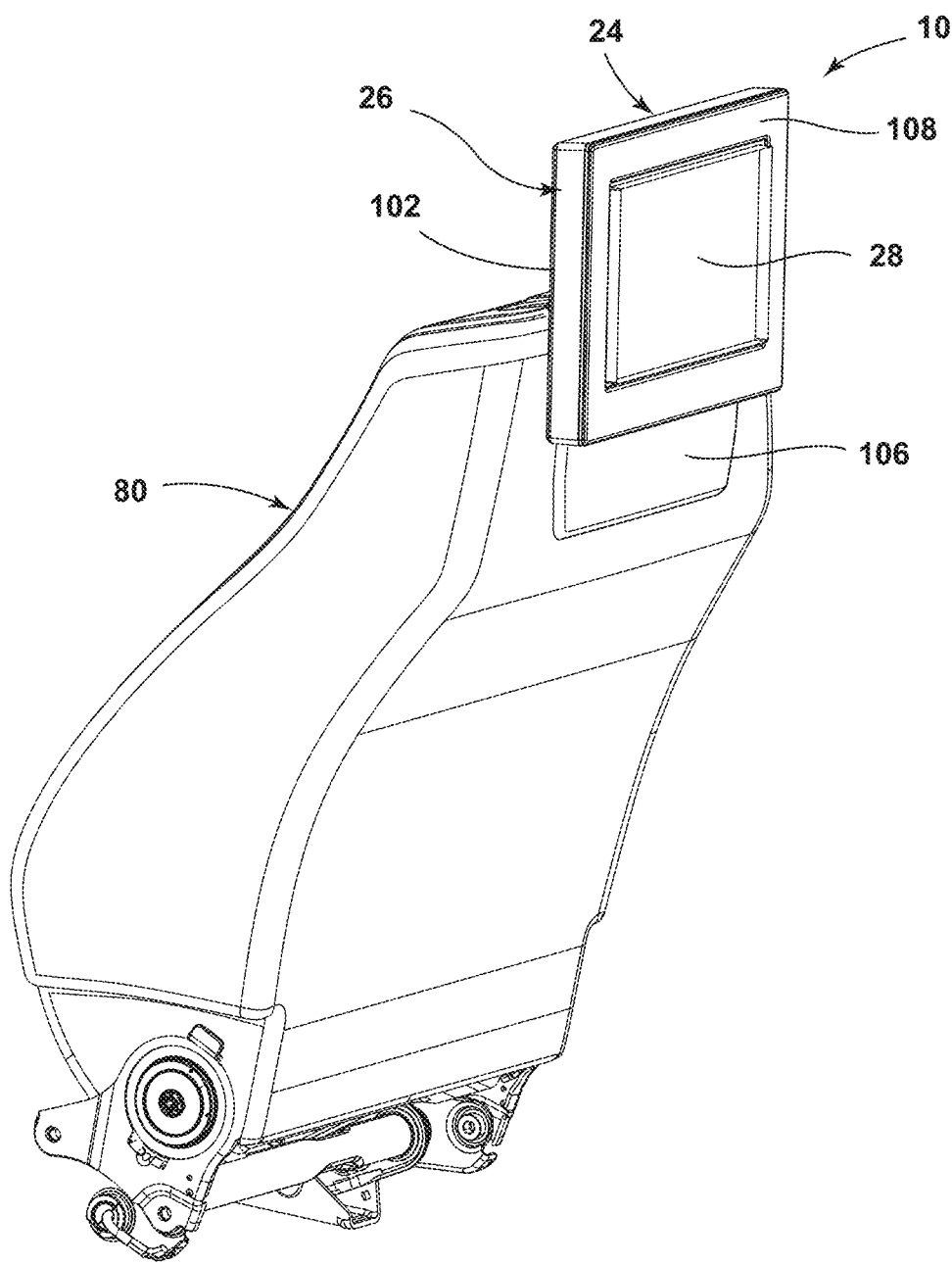
FIG. 3 is a rear perspective view of a display assembly coupled to a seatback of a vehicle seating assembly, according to the present disclosure.

Referring to FIGS. 2 and 3, each seating assembly 10 includes a seatback 80 pivotally coupled to a seat base 82. The seat base 82 is generally coupled with rail assemblies 84 for translating the seating assembly 10 fore and aft in the interior compartment 70 of the vehicle 12. Additionally, each seating assembly 10 includes the headrest assembly 52 operably coupled to a top of the seatback 80. Each headrest assembly 52 is generally adjustable between different heights relative to the top of the respective seatback 80 and may also pivot between different angles relative to the seatback 80.

Figure 4:
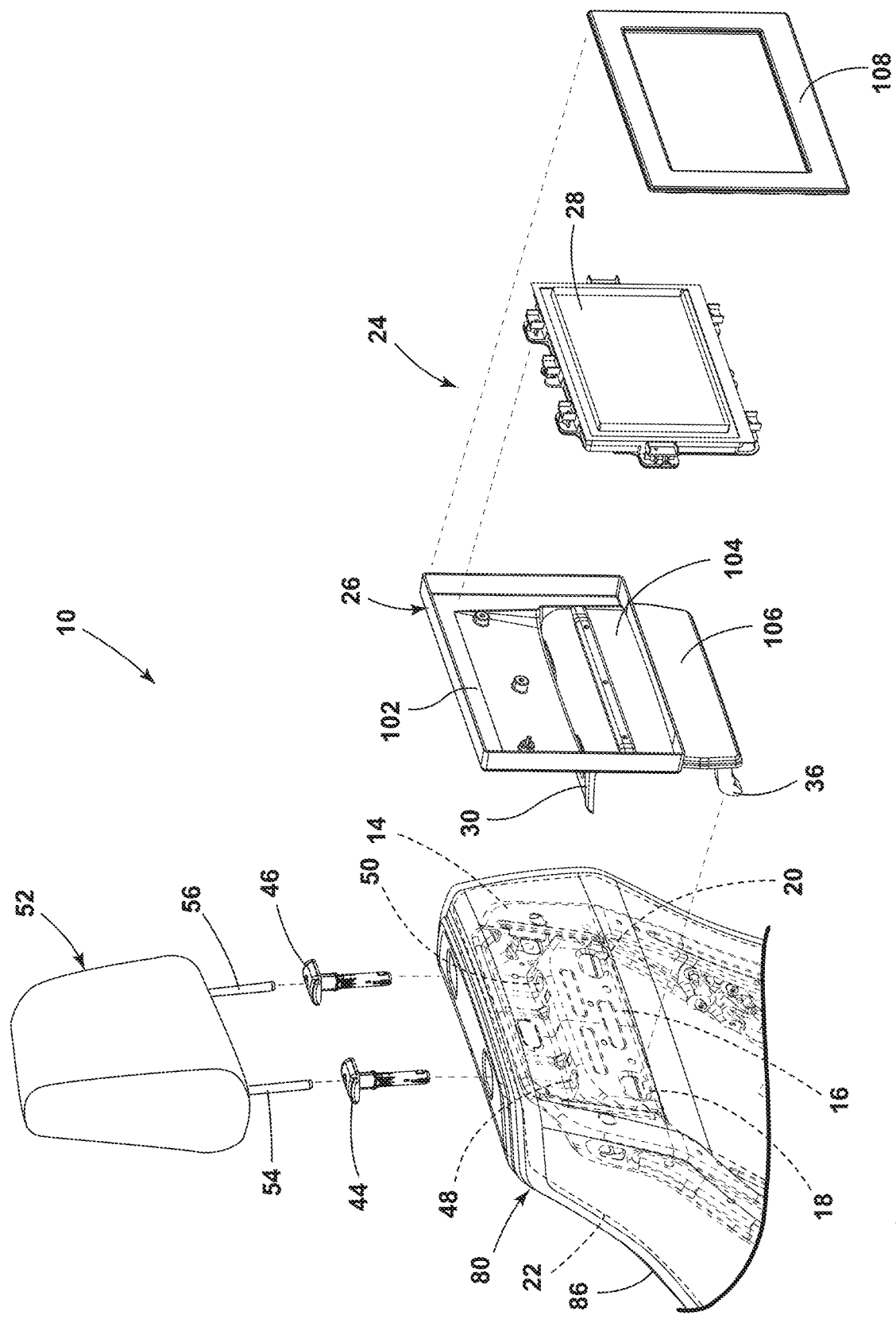
FIG. 4 is a top perspective exploded view of a display assembly for a vehicle seating assembly, according to the present disclosure.

Referring to FIG. 4, the seatback 80 includes the seatback frame 14, the support member 22, and a trim feature 86. The support member 22 is generally a cushion or pad within the seating assembly 10 that provides support and comfort for the passenger on the seating assembly 10. The support member 22 may be foam or another elastically deformable member within seating assembly 10. The support member 22 generally extends over the support frame 26. The trim feature 86 extends over the support member 22. The trim feature 86 may be a flexible coverstock that extends around a substantial portion of the support member 22. However, it is contemplated that the trim feature 86 may be a rigid structure or may be coupled to a portion (e.g., a vehicle-rearward portion) of the seating assembly 10.

The display assembly 24 is coupled to the vehicle-rearward side of the seating assembly 10 and extends between the headrest assembly 52 and the seatback 80. The display assembly 24 includes the support frame 26 for supporting and housing the display 28. The support frame 26 includes a housing portion 102 that defines a space 104 to receive the display 28 and a coupling extension 106 extending vertically from the housing portion 102. Each of the housing portion 102 and the coupling extension 106 provides a direct or indirect interface between the support frame 26 and the seatback frame 14 to retain the display assembly 24 to the seating assembly 10.

The display assembly 24 also includes a bezel 108 that extends around the perimeter of the display 28. The bezel 108 couples with the housing portion 102 to conceal edges of the display 28 and any connectors between the display 28 and the housing portion 102 to improve the appearance of the display assembly 24. The display 28 may be coupled to the support frame 26 by connectors, adhesives, fasteners, etc. The display 28 may have any practicable configuration without departing from the teachings herein. For example, the display 28 may be a 10-inch, flat display screen. The display 28 may also include an additional protective cover to protect against sharp edges of the display 28.

Referring still to FIG. 4, the support frame 26 directly couples to the seatback frame 14. Accordingly, apertures or slots are defined in each of the support member 22 and the trim feature 86 to allow the support frame 26 to extend through each component to engage the seatback frame 14. Additionally, the guide members 46, 44 directly engage the seatback frame 14 to secure both the display assembly 24 and the headrest assembly 52 to the seatback 80. The support member 22 and the trim feature 86 define additional apertures or slots for receiving the guide members 44, 46.

Figure 5:
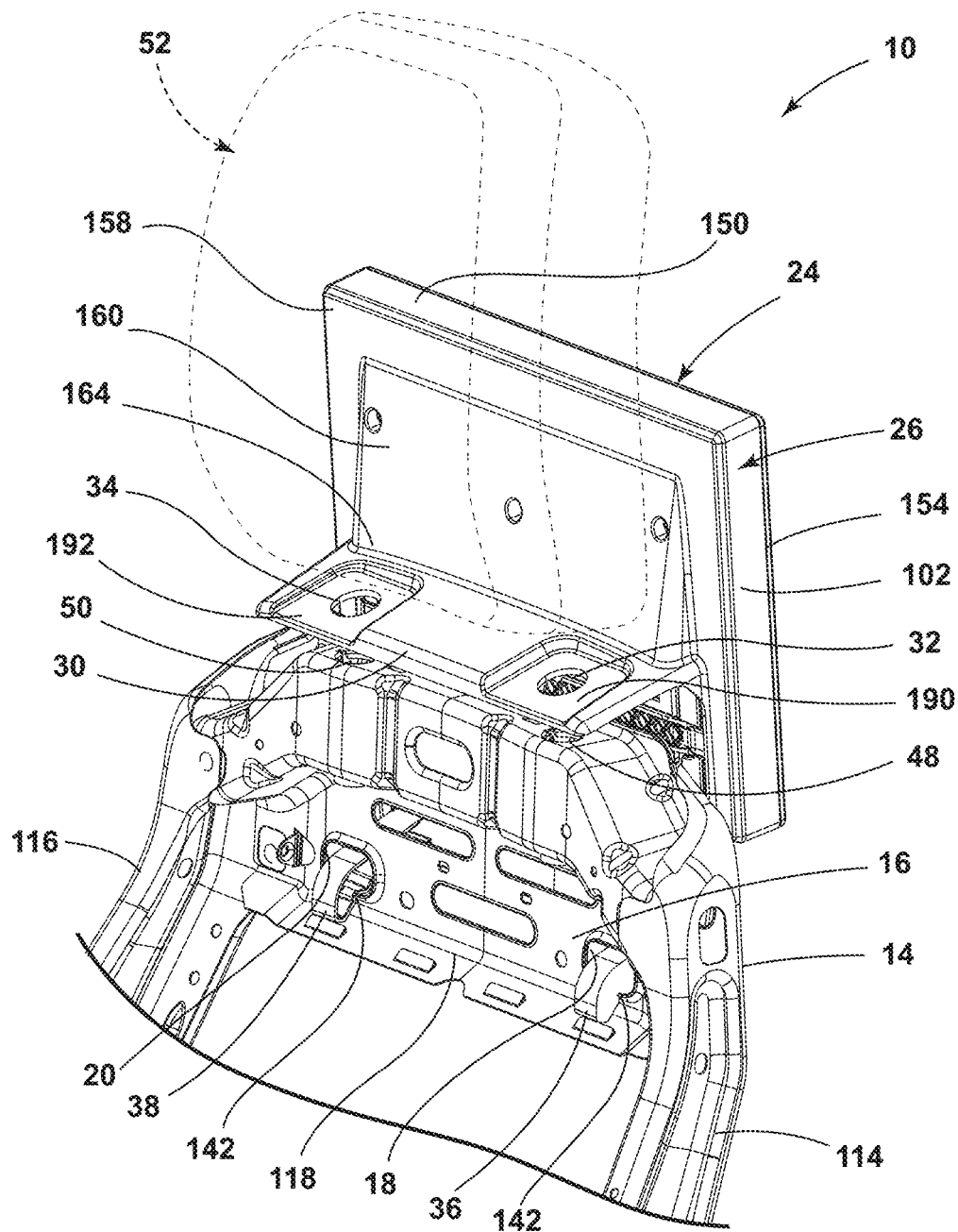
FIG. 5 is a front perspective view of a seatback frame having a display assembly, according to the present disclosure.
Figure 6:
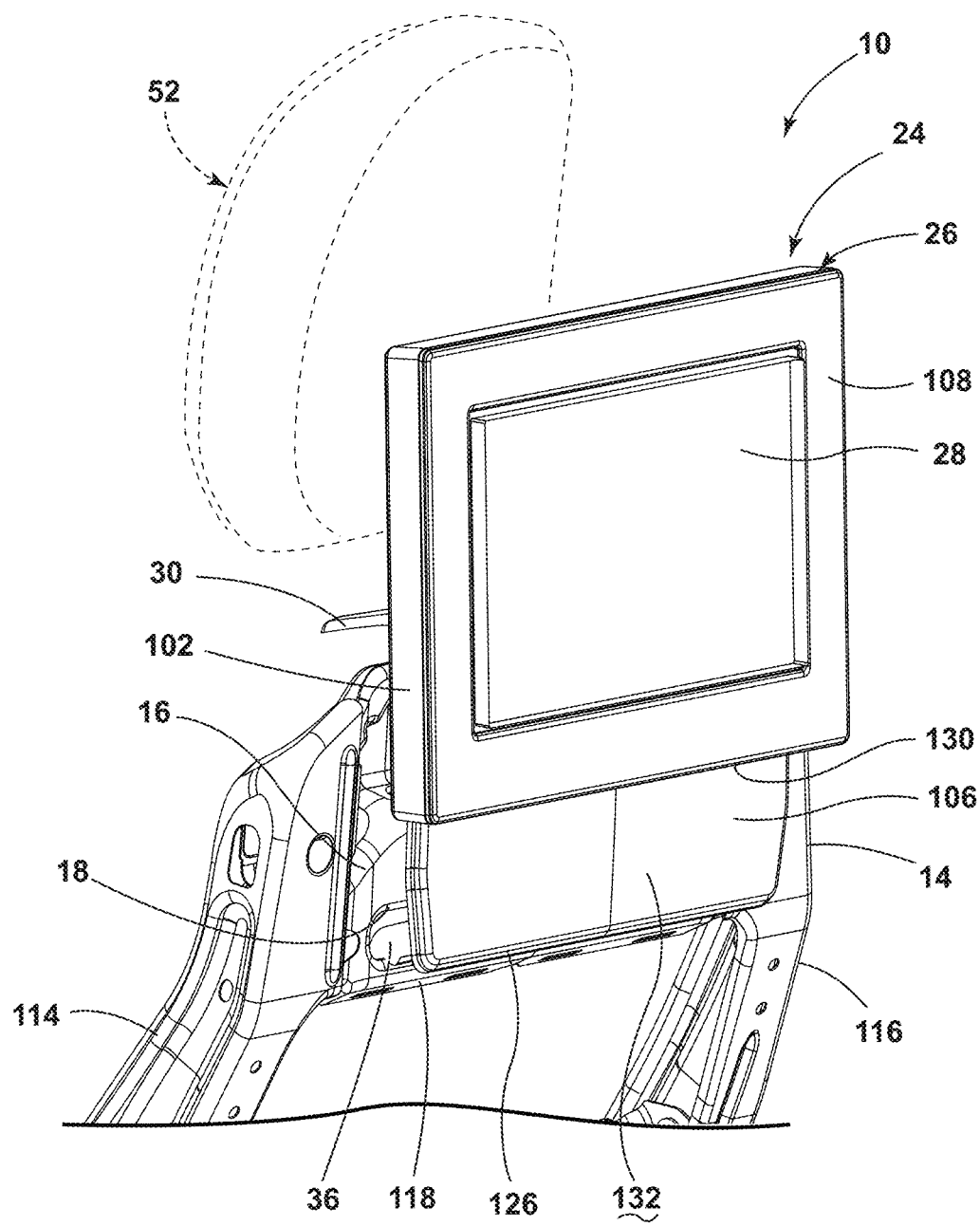
FIG. 6 is a rear perspective view a seatback frame having a display assembly, according to the present disclosure.

Referring to FIGS. 5 and 6, the seatback frame 14 includes the cross member 16 extending between arms 114, 116. The apertures 18, 20 are defined proximate a bottom edge 118 of the cross member 16. The apertures 18, 20 are generally stamped into the cross member 16 during a manufacturing process. The aperture 18 is arranged in horizontal alignment with the aperture 20, such that each aperture 18, 20 is a substantially same distance from the bottom edge 118 of the cross member 16.

The hooks 36, 38 extend from an inner surface 124 of the coupling extension 106 of the support frame 26 and through the respective aperture 18, 20 of the cross member 16. Accordingly, the hook 36 is arranged parallel to and is horizontally aligned with the hook 38. The hooks 36, 38 have a length sufficient to extend through the trim feature 86 and the support member 22 to engage the seatback frame 14 while the coupling extension 106 abuts the trim feature 86. The hooks 36, 38 extend from the inner surface 124 adjacent to, but spaced from, a bottom edge 126 of the coupling extension 106. The hooks 36, 38 curve beyond the bottom edge 126 of the coupling extension 106, such that ends of the hooks, 36, 38 are disposed vertically below the bottom edge 126 of the coupling extension 106. The interface between the hooks 36, 38 and the seatback frame 14 provides a base support for the display assembly 24.

Figure 7:
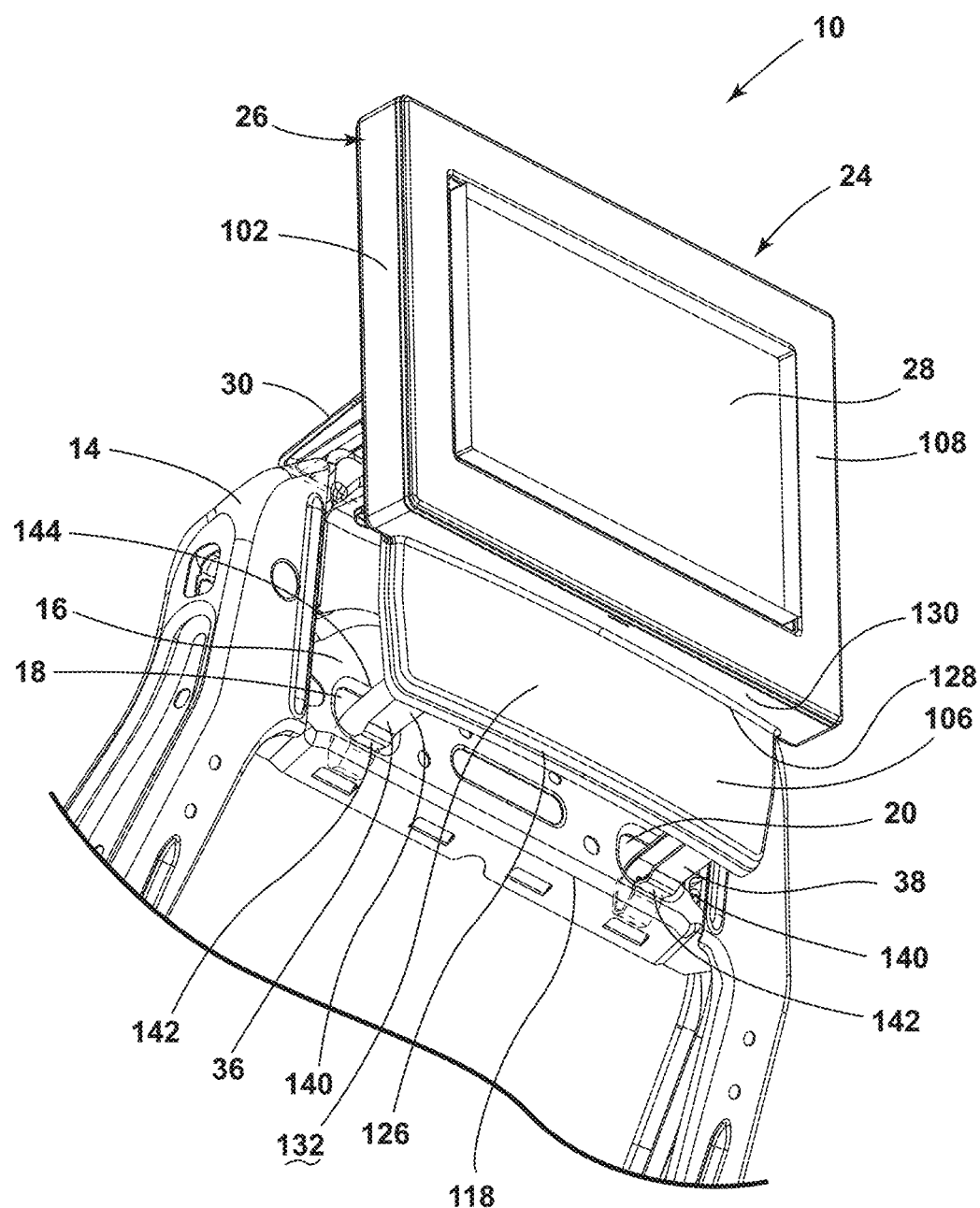
FIG. 7 is a bottom perspective view of a display assembly coupled to a seatback frame of a vehicle seating assembly, according to the present disclosure.

Referring still to FIGS. 5 and 6, as well as FIG. 7, each hook 36, 38 has an underside 140 the defines a notch 142. An edge of the cross member 16 that defines the apertures 18, 20 is disposed within the notch 142 of the respective hook 36, 38. The engagement between the edges of the cross member 16 and the notches 142 forms an interlocking connection between the hooks 36, 38 of the support frame 26 and the cross member 16 of the seatback frame 14. The interlocking connection may further secure the support frame 26 to the cross member 16 during vehicle maneuvers. Additionally or alternatively, each hook 36, 38 may include a clip anchor configured to engage the seatback frame 14 for further securing the engagement between the hooks 36, 38 and the seatback frame 14.

Figure 8:
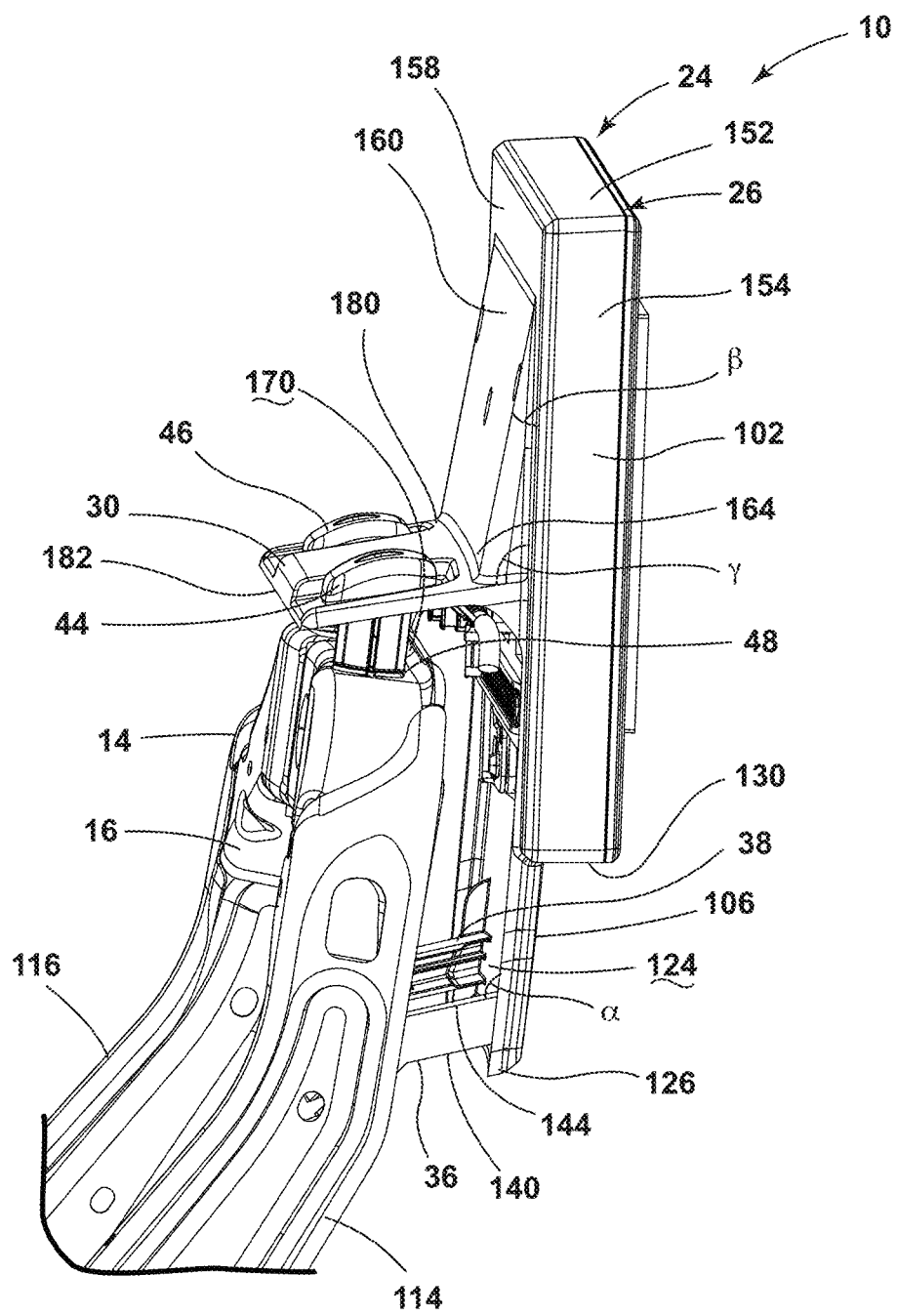
FIG. 8 is a side perspective view of a display assembly coupled to a seatback frame of a vehicle seating assembly, according to the present disclosure.

Referring still to FIG. 7, as well as FIG. 8, as previously stated, the hooks 36, 38 are disposed adjacent to the bottom edge 126 of the coupling extension 106. A top edge 128 of the coupling extension 106 is coupled to a bottom 130 of the housing portion 102. The coupling extension 106 generally extends from the housing portion 102 a sufficient distance to align the hooks 36, 38 with the apertures 18, 20 of the cross member 16. A front surface 132 of the coupling extension 106 is setback from the bezel 108 of the display assembly 24. The top edge 128 of the coupling extension 106 generally has a width that is less than a width of the housing portion 102. Additionally or alternatively, the top edge 128 of the coupling extension 106 has a width that is greater than a width of the bottom edge 126 of the coupling extension 106. Accordingly, the coupling extension 106 narrows as the coupling extension 106 extends away from the housing portion 102, contributing to an embedded or integrated appearance of the display assembly 24.

The hooks 36, 38 are spaced from the bottom edge 126 of the coupling extension 106. Edges, including the bottom edge 126, of the coupling extension 106 curve toward the seatback frame 14. The offset configuration of the hooks 36, 38 and the curved edges of the coupling extension 106 allow the coupling extension 106 to press into the trim feature 86 when the display assembly 24 is coupled with the seating assembly 10. Moreover, the coupling extension 106 is generally arcuate. This configuration may be advantageous for providing a bezel-like finish to the display assembly 24 where the display assembly 24 appears to be embedded within the seating assembly 10.

The hooks 36, 38 each extend at an obtuse angle α from the inner surface 124 of the coupling extension 106. Each obtuse angle α is generally defined between a top surface 144 of the respective hook 36, 38 and the inner surface 124 of the coupling extension 106. The obtuse angle α of each hooks 36, 38 may provide for proper alignment of the display assembly 24 relative to the seatback frame 14 for viewing by the passenger on the vehicle-rearward seating assembly 74. The obtuse angle α may also provide proper engagement between the hooks 36, 38 and the seatback frame 14.

Figure 9:
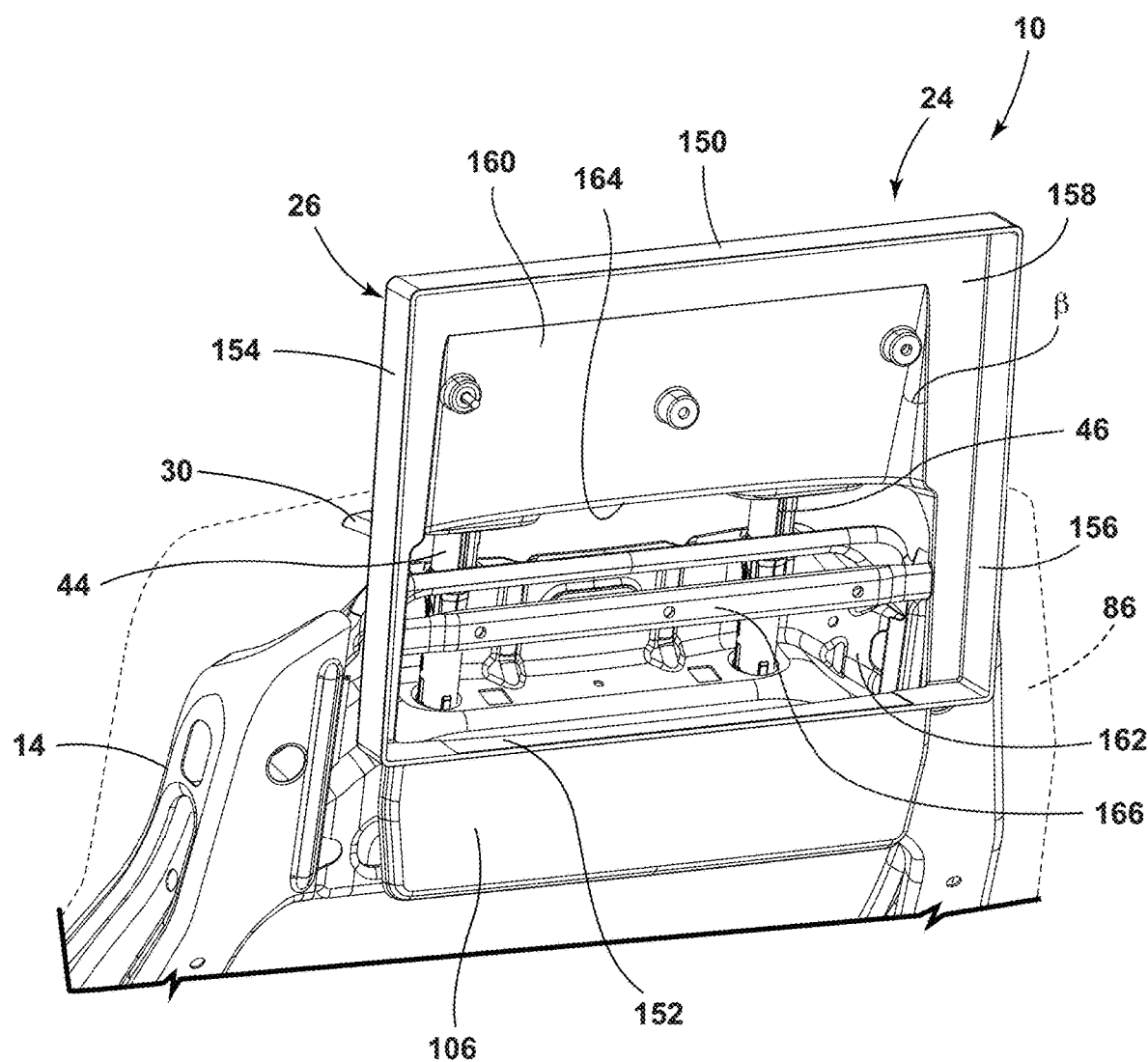
FIG. 9 is a front perspective view of a support frame of a display assembly coupled to a seatback frame of a vehicle seating assembly, according to the present disclosure.

Referring still to FIG. 8, as well as FIG. 9, the housing portion 102 is disposed vertically above the coupling extension 106 and extends above the top of the seatback 80. The housing portion 102 includes upper and lower walls 150, 152 extending between sidewalls 154, 156, which collectively define the space 104 for receiving the display 28. A rim 158 extends partially around the perimeter of the space 104. In the illustrated configuration, the rim 158 is U-shaped and extends along the sidewalls 154, 156 and the upper wall 150. A rear wall 160 extends from the rim 158 adjacent to the upper wall 150. The rear wall 160 extends a portion of the length of the sidewalls 154, 156. Accordingly, the housing portion 102 defines an opening 162 between a bottom edge 164 of the rear wall 160 and the lower wall 152. The rim 158 adjacent to the sidewalls 154, 156 has a greater width adjacent to the rear wall 160 compared to the rim 158 adjacent to the opening 162 to provide support for the rear wall 160. An elongate support feature 166 extends between sidewalls 154, 156 through the opening 162 to provide increased support to the housing portion 102. The elongate support feature 166 may include ribs 168 on an inner side thereof to further increase support for the support frame 26.

The rear wall 160 extends at an angle relative to the rim 158. In the illustrated configuration, the rear wall 160 extends at an acute angle β relative to the rim 158, such that the bottom edge 164 of the rear wall 160 is offset from the rim 158. The rear wall 160 extends away from the display 28. This configuration may allow the bottom edge 164 of the rear wall 160 to rest on the top of the seatback 80. Additionally or alternatively, the rear wall 160 has curved sides to couple the angled rear wall 160 to the rim 158 adjacent to the sidewalls 154, 156.

Referring still to FIGS. 8 and 9, the coupling ledge 30 extends from the housing portion 102, in the same direction as the hooks 36, 38, and over the cross member 16. The coupling ledge 30 is generally spaced from a top surface 170 of the cross member 16 by the support member 22 and the trim feature 86. A proximal edge 180 of the coupling ledge 30 is coupled to the bottom edge 164 of the rear wall 160 and the rim 158 adjacent to the bottom edge 164. Accordingly, the proximal edge 180 of the coupling ledge 30 extends a substantially same width as the housing portion 102, which is less than a width of the rear wall 160. The coupling ledge 30 generally extends at an obtuse angle γ from the housing portion 102. The obtuse angle γ is defined between a top surface of the coupling ledge 30 and the rim 158 adjacent to each sidewall 154, 156. As best illustrated in FIG. 8, the obtuse angle γ of the coupling ledge 30 and the obtuse angle α of the hooks 36, 38 may be substantially similar. This configuration may be advantageous for supporting upper and lower portions of the display assembly 24 at a uniform angle relative to the seatback frame 14 to optimize viewing of the display 28.

Figure 10:
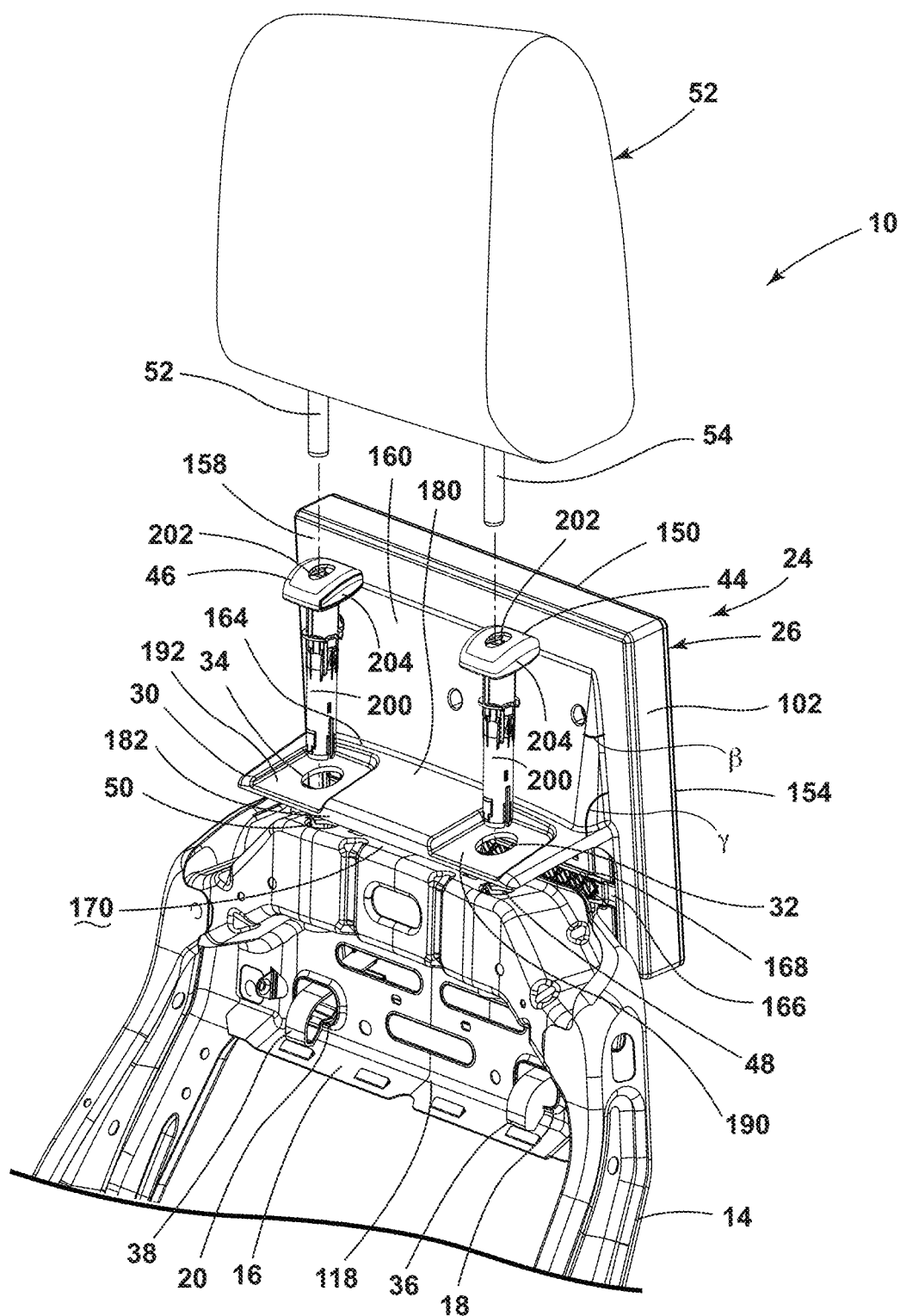
FIG. 10 is an exploded view of a headrest assembly and a display assembly for a vehicle seating assembly, according to the present disclosure.
Figure 11:
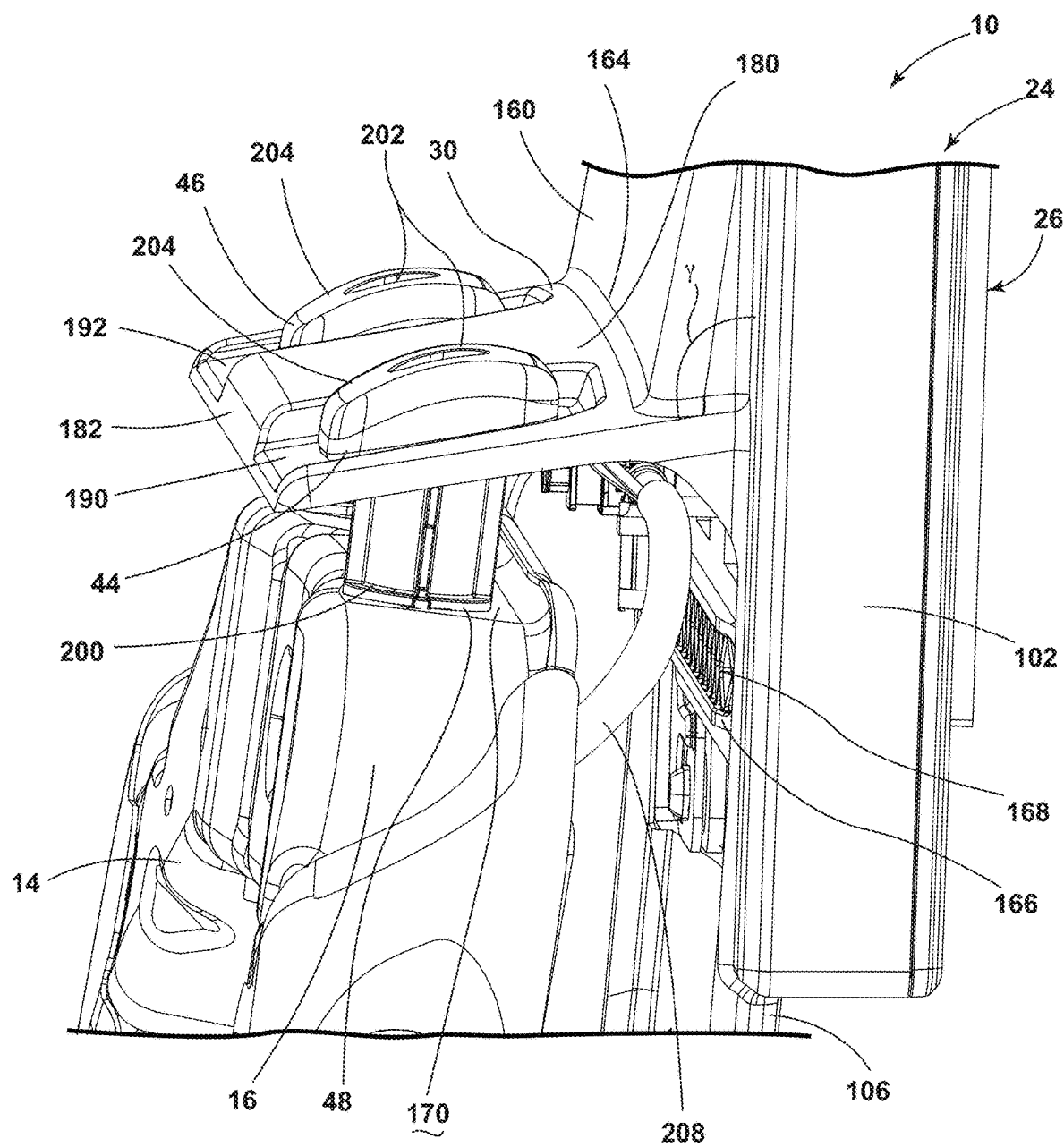
FIG. 11 is a partial side perspective view of a display assembly with an electrical connector extending to a seatback frame, according to the present disclosure.

Referring to FIGS. 10 and 11, the proximal edge 180 of the coupling ledge 30 may have a width greater than a width of a distal edge 182, such that the coupling ledge 30 narrows as the coupling ledge 30 extends away from the rear wall 160. This configuration may be advantageous for supporting the housing portion 102 while minimizing interference with the headrest assembly 52 and the passenger on the seating assembly 10. The coupling ledge 30 defines a recess 190 spaced apart from a recess 192, with the recesses 190, 192 defined adjacent to opposing side edges of the coupling ledge 30. The recesses 190, 192 are spaced from the proximal edge 180 of the coupling ledge 30 and extend to the distal edge 182. Accordingly, the distal edge 182 at least partially defines the recesses 190, 192. Each receiving slot 32, 34 is defined within a separate recess 190, 192.

When the coupling ledge 30 is in position over the top of the seatback, the receiving slots 32, 34 vertically align with the guide slots 48, 50 defined in the top surface 170 of the cross member 16 to receive the guide members 44, 46. Each guide member 44, 46 extends through the respective receiving slot 32, 34 defined in the coupling ledge 30 and the respective guide slot 48, 50 defined in the cross member 16. The guide members 44, 46 provide an upper support for display assembly 24 and an upper interface with the seatback frame 14. Each guide member 44, 46 includes an elongate engagement feature 200 that extends through one of the receiving slots 32, 34 and the corresponding guide slot 48, 50. Each elongate engagement feature 200 defines a channel 202 to receive an individual headrest support 54, 56. The headrest supports 54, 56 are positioned within the respective channel 202 when the headrest assembly 52 is coupled with the seatback frame 14.

Each guide member 44, 46, includes a head 204 coupled to the elongate engagement feature 200. Each head 204 at least partially defines the respective channel 202 for receiving the headrest support 54, 56. Each head 204 has a greater depth and width than the elongate engagement features 200 to prevent the heads 204 from moving through the receiving slots 32, 34. The heads 204 rest on a surface within the respective recess 190, 192 adjacent to the receiving slot 32, 34. Top surfaces of the heads 204 are generally rounded or curved, which may be advantageous for minimizing interference with the headrest assembly 52. Additionally or alternatively, each head 204 may include a grip for providing grasping locations to adjust the guide members 44, 46 relative to the seatback frame 14. The guide members 44, 46 operate as locking features for retaining the display assembly 24 to the seatback frame 14. The guide members 44, 46 generally secure against vertical and horizontal movement of the display assembly 24.

The configuration of the display assembly 24 allows an electrical connector 208 to be obscured from view. The electrical connector 208 extends from the display 28, through the opening 162, below the coupling ledge 30, and toward the seatback frame 14. The electrical connector 208 extends through the seatback 80 to provide power to the display 28. Obscuring the electrical connector 208 from view may contribute to the integrated appearance of the display assembly 24 within the seating assembly 10. It is contemplated that the display assembly 24 may be communicatively or electrically coupled with other electronic devices through wired or wireless connections. Any wiring or hardware for the connections to other electronic devices may be disposed within the seating assembly 10.

Figure 12:
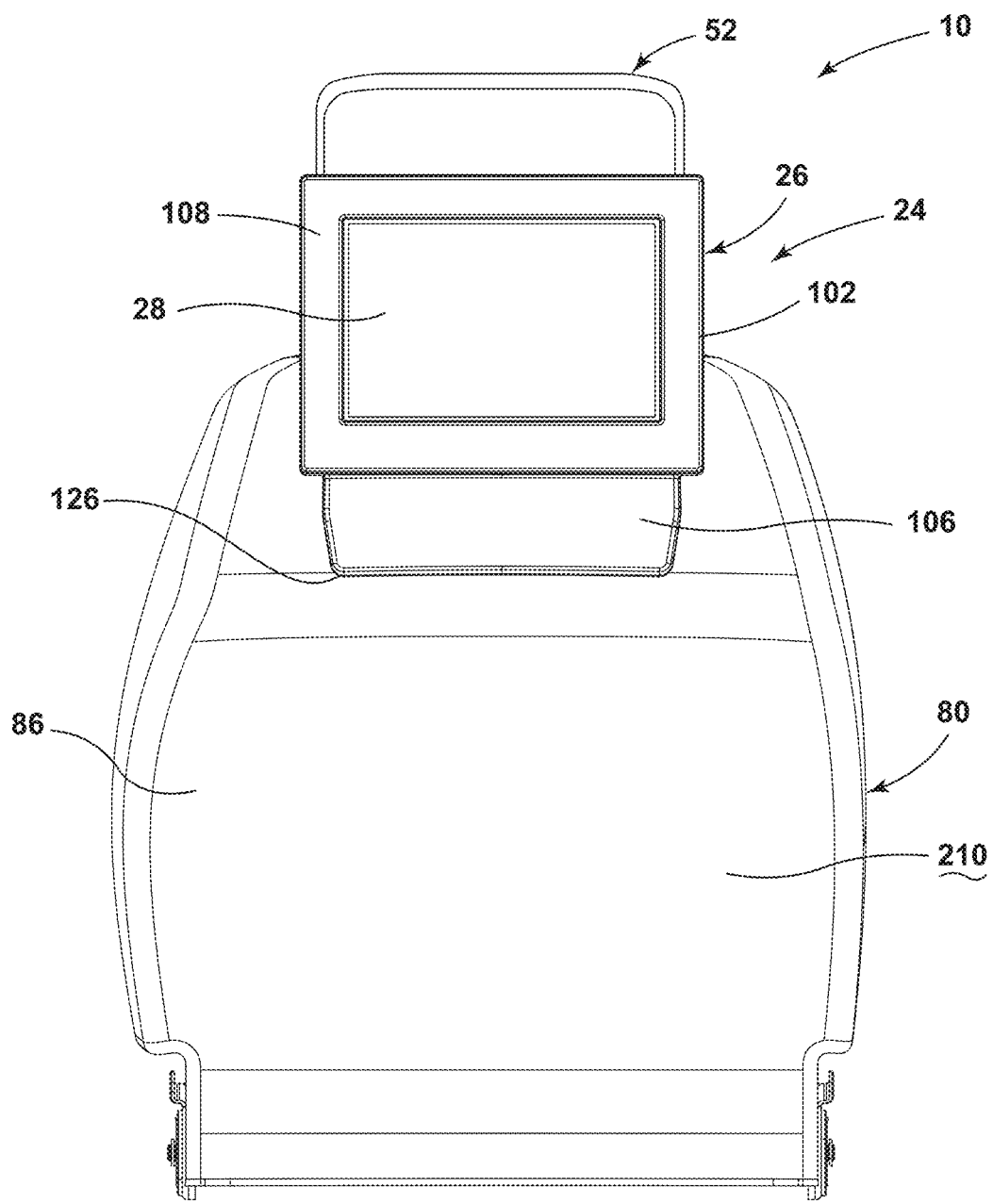
FIG. 12 is a rear elevational view of a vehicle seating assembly that includes a display assembly.
Figure 13:
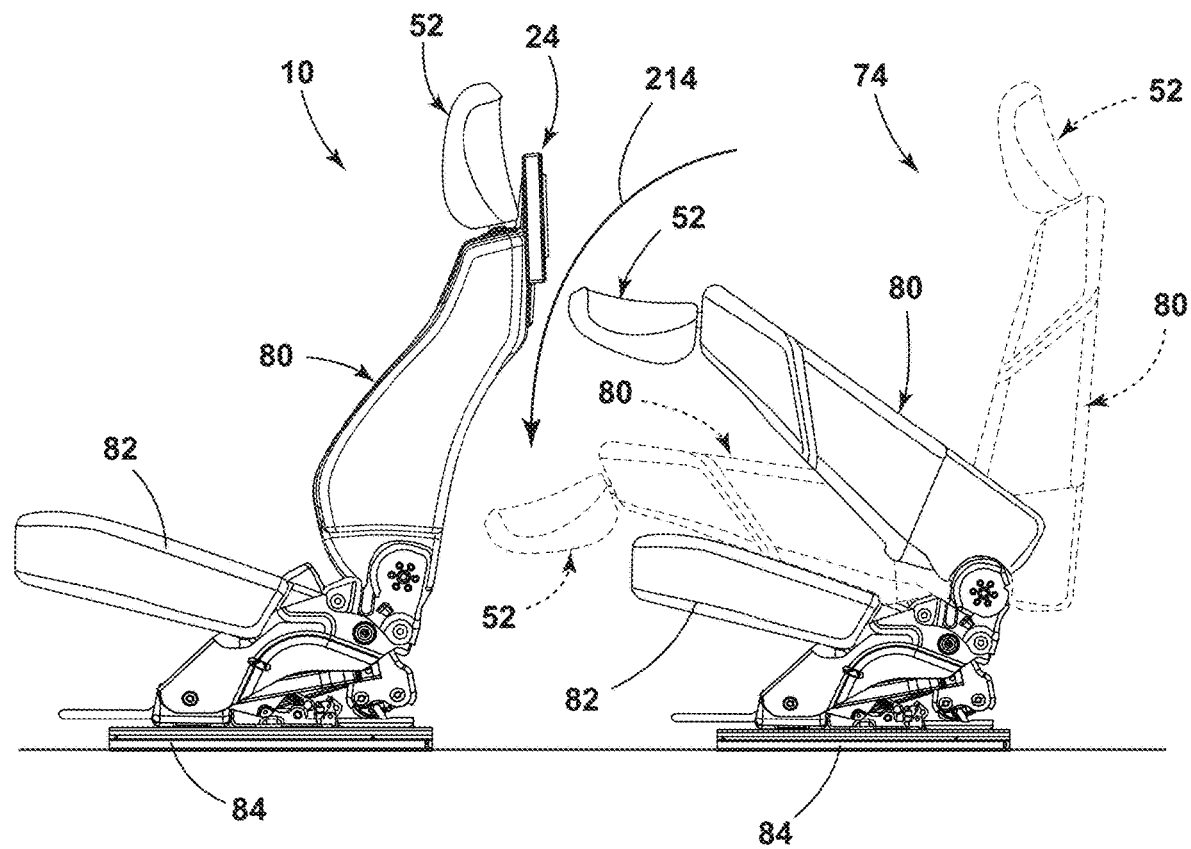
FIG. 13 is a schematic view of a movement path of a vehicle-rearward seating assembly, according to the present disclosure.

Referring to FIGS. 12 and 13, as previously stated, the display assembly 24 extends between the headrest assembly 52 and the seatback 80 on the vehicle-rearward side of the seating assembly 10. The housing portion 102 is disposed vertically above the coupling extension 106. Both the housing portion 102 and the coupling extension 106 at least partially abut an outer surface 210 of the seatback 80 (e.g., the trim feature 86). The support frame 26 is pressed against the vehicle-rearward side of the seating assembly 10 to reduce a distance the display assembly 24 extends from the outer surface 210 of the seating assembly 10. The reduced distance the display assembly 24 extends from the seating assembly 10 minimizes interference between the display assembly 24 and a movement path 214 of the seating assembly 74. As the seatback 80 of the seating assembly 74 rotates between an upright position and a folded position, the seatback 80 travels along the movement path 214. The configuration of the display assembly 24 disclosed herein does not substantially impinge the movement path 214 of the seating assembly 74. Additionally, the positioning of the display assembly 24 optimizes an ingress and egress space of the seating assembly 74.

Referring to FIGS. 1-13, the display assembly 24 may be coupled with the seating assembly 10 during manufacturing or in a separate final assembly location. To couple the display assembly 24 to the seating assembly 10, the hooks 36, 38 extend through the trim feature 86 and the support member 22 and are positioned within the respective aperture 18, 20 with the notches 142 aligned with the edges of the cross member 16. The support frame 26 is then rotated upwards until the coupling ledge 30 is in position over the top of the seatback 80. The coupling ledge 30 extends over the top of the seatback 80 between the seatback 80 and the headrest assembly 52. The coupling ledge 30 generally rests on the trim feature 86 at the top of the seatback 80. The guide members 44, 46 extend through the receiving slots 32, 34 of the coupling ledge 30 and into the guide slots 48, 50 of the cross member 16. Accordingly, the hooks 36, 38 provide a base support and connection for the display assembly 24, and the guide members 44, 46 provide an upper support and connection for the display assembly 24. The guide members 44, 46 retain the support frame 26 in the upright position against the seatback 80 and couple the headrest assembly 52 to the seatback 80. The electrical connector 208 is secured under the trim feature 86 and extends through the seatback 80. The trim feature 86 then encloses the support member 22 (e.g., a zipper, a back panel adherence, etc.). Additionally, the headrest supports 54, 56 are be positioned within the guide members 44, 46.

The trim feature 86 may be flexible and include a foam backing or laminate to provide tension to the trim feature 86. The offset arrangement of the hooks 36, 38 and the curved edges of the coupling extension 106 allow the coupling extension 106 to press into the trim feature 86 and provide a bezel-like finish for the display assembly 24. The tension of the trim feature 86 and the configuration of the support frame 26 allows the support frame 26 to press in or 'bite into' the trim feature 86, thereby providing the embedded or integrated appearance of the display assembly 24 within the seating assembly 10.

Use of the present device may provide for a variety of advantages. For example, the support frame 26 may provide a load-bearing structure against occupant pull and abuse forces. Additionally, the display assembly 24 may be easily assembled as a sub-system and shipped to a final assembly location. Further, the display assembly 24 may couple with the seatback frame 14 of a variety of styles and models of seating assemblies 10, 74. Also, the display assembly 24 and the trim feature 86 may create the bezel-like finish when the support frame 26 presses into the trim feature 86 and providing the integrated appearance. Further, the display assembly 24 provides for the bezel 108, as well as other aesthetic pieces, to have a structural attachment to the seating assembly 10. Moreover, the display assembly 24 may optimize feature attachment locations of the display assembly 24 to the seating assembly 10. Additionally, the display assembly 24 may have a base support provided by the interface between the hooks 36, 38 and the support frame 26 and an upper support provided by the guide members 44, 46 extending through the coupling ledge 30 and the support frame 26. Moreover, the configuration of the display assembly 24 within the vehicle 12 provides audio and visual information directly to passengers in a specific area of the vehicle 12. Also, the display assembly 24 may reduce manufacturing costs. Additional benefits and advantages of using this device may be realized and/or achieved.

According to one example, a vehicle seating assembly includes a seatback frame that has a cross member. The cross member defines apertures. A support member is coupled to the seatback frame. A display assembly includes a support frame and a display. The support frame includes a coupling ledge that defines receiving slots and that extends over the cross member and the support member. The support frame includes hooks that extend through the support member and through the apertures defined by the cross member. Embodiments of an aspect of the present disclosure can include any one or a combination of the following features:

the support frame includes a housing portion having upper and lower walls, wherein the housing portion includes an angled rear wall that extends from the upper wall toward the lower wall;

the housing portion defines an opening between a bottom edge of the angled rear wall and the lower wall, wherein an elongate support feature extends through the opening and between opposing sidewalls of the housing portion;

the support frame includes the housing portion and a coupling extension, wherein the coupling ledge extends from the housing portion and the hooks extend in a same direction from the coupling extension;

a trim feature extends over the support member, wherein the hooks extend through the trim feature, and wherein the housing portion and the coupling extension abut an outer surface of the trim feature;

each hook has an underside that defines a notch, wherein an edge of the cross member that defines the apertures is disposed in the notch of the respective hook; and each receiving slot is defined within a recess of the coupling ledge, wherein each recess is defined proximate a side edge of the coupling ledge.

According to another example, a vehicle seat display assembly includes a seatback frame that has a cross member that defines apertures adjacent a bottom edge of the cross member. The cross member includes a top surface that defines guide slots. A display assembly includes a support frame that defines a space for receiving a display. Hooks extend from proximate a bottom edge of the support frame. Each hook extends through one of the apertures that are defined by the cross member. A coupling ledge extends from the support frame and over the top surface of the cross member. The coupling ledge defines receiving slots that vertically align with the guide slots. Guide members extend through the receiving slots of the coupling ledge and the guide slots of the seatback frame to couple the support frame to the seatback frame.

Embodiments of an aspect of the present disclosure can include any one or a combination of the following features:

each receiving slot is defined within a recess, wherein each recess extends to a distal edge of the coupling ledge;

each guide member includes an elongate engagement feature that defines a channel for receiving a headrest support and a head that is positioned on a surface within the respective recess;

each hook defines a notch that engages an edge of the cross member that defines the respective aperture;

the support frame includes a housing portion and a coupling extension that extend vertically from a bottom of the housing portion, wherein the hooks extend from the coupling extension, and wherein the coupling ledge extends from the housing portion;

the housing portion includes upper and lower walls that extend between opposing sidewalls, wherein a rim extends along the upper wall and the opposing sidewalls;

the housing portion includes a rear wall that extends from the rim, wherein the rear wall extends at an acute angle relative to the rim such that a bottom edge of the rear wall is offset from the rim; and the coupling ledge extends from the bottom edge of the rear wall.

According to yet another example, a display assembly for a vehicle seat includes a housing portion that defines a space for receiving a display. The housing portion includes an angled rear wall. A coupling ledge extends from the angled rear wall. The coupling ledge defines a receiving slot within a recess. A coupling extension has a top edge and a bottom edge. The top edge of the coupling extension is coupled to a bottom of the housing portion. A hook is coupled to and extends from an inner surface of the coupling extension. The hook is disposed adjacent to the bottom edge of the coupling extension. Embodiments of an aspect of the present disclosure can include any one or a combination of the following features:

the coupling extension is arcuate, wherein a width of the coupling extension is less than a width of the housing portion;

the hook has an underside that defines a notch configured to engage said vehicle seat;

the housing portion includes sidewalls and a rim that extend from each sidewall, wherein an obtuse angle is defined between the coupling ledge and the rim adjacent each sidewall;

and an obtuse angle is defined between a top side of the hook and an inner surface of the coupling extension.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seating assembly, comprising:
   a seatback frame including a cross member, wherein the cross member defines apertures;
   a support member coupled to the seatback frame;
   a display assembly including a support frame and a display, wherein the support frame includes a coupling ledge that defines receiving slots and that extends over the cross member and the support member, and wherein the support frame includes hooks that extend through the support member and through the apertures defined by the cross member;
   guide members extending through the receiving slots of the support frame, the support member, and guide slots of the seatback frame; and
   a headrest assembly having headrest supports, wherein the headrest supports are positioned within the guide members.

2. The vehicle seating assembly of claim 1, wherein the support frame includes a housing portion with upper and lower walls, wherein the housing portion includes an angled rear wall that extends from the upper wall toward the lower wall.

3. The vehicle seating assembly of claim 2, wherein the housing portion defines an opening between a bottom edge of the angled rear wall and the lower wall, and wherein an elongate support feature extends through the opening and between opposing sidewalls of the housing portion.

4. The vehicle seating assembly of claim 1, wherein the support frame includes a housing portion and a coupling extension, wherein the coupling ledge extends from the housing portion and the hooks extend in a same direction from the coupling extension.

5. The vehicle seating assembly of claim 4, further comprising:
   a trim feature extending over the support member, wherein the hooks extend through the trim feature, and wherein the housing portion and the coupling extension abut an outer surface of the trim feature.

6. The vehicle seating assembly of claim 1, wherein each hook has an underside defining a notch, and wherein an edge of the cross member that defines the apertures is disposed in the notch of the respective hook.

7. The vehicle seating assembly of claim 1, wherein each receiving slot is defined within a recess of the coupling ledge, and wherein each recess is defined proximate a side edge of the coupling ledge.

8. A vehicle seat display assembly, comprising:
   a seatback frame having a cross member defining apertures adjacent a bottom edge of the cross member, wherein the cross member includes a top surface defining guide slots;
   a display assembly including:
      a support frame defining a space for receiving a display;
      hooks extending from proximate a bottom edge of the support frame, wherein each hook extends through one of the apertures defined by the cross member; and
      a coupling ledge extending from the support frame and over the top surface of the cross member, wherein the coupling ledge defines receiving slots that vertically align with the guide slots; and
   guide members extending through the receiving slots of the coupling ledge and the guide slots of the seatback frame to couple the support frame to the seatback frame.

9. The vehicle seat display assembly of claim 8, wherein each receiving slot is defined within a recess, and wherein each recess extends to a distal edge of the coupling ledge.

10. The vehicle seat display assembly of claim 9, wherein each guide member includes an elongate engagement feature defining a channel for receiving a headrest support and a head that is positioned on a surface within the respective recess.

11. The vehicle seat display assembly of claim 8, wherein each hook defines a notch that engages an edge of the cross member that defines the respective aperture.

12. The vehicle seat display assembly of claim 8, wherein the support frame includes a housing portion and a coupling extension that extends vertically from a bottom of the housing portion, wherein the hooks extend from the coupling extension, and wherein the coupling ledge extends from the housing portion.

13. The vehicle seat display assembly of claim 12, wherein the housing portion includes upper and lower walls extending between opposing sidewalls, and wherein a rim extends along the upper wall and the opposing sidewalls.

14. The vehicle seat display assembly claim 13, wherein the housing portion includes a rear wall extending from the rim, wherein the rear wall extends at an acute angle relative to the rim such that a bottom edge of the rear wall is offset from the rim.

15. The vehicle seat display assembly of claim 14, wherein the coupling ledge extends from the bottom edge of the rear wall.

16. A display assembly for a vehicle seat, comprising:
   a housing portion defining a space for receiving a display, wherein the housing portion includes an angled rear wall;
   a coupling ledge extending from the angled rear wall, wherein the coupling ledge defines a receiving slot within a recess;

a coupling extension having a top edge and a bottom edge, wherein the top edge of the coupling extension is coupled to a bottom of the housing portion; and a hook coupled to and extending from an inner surface of the coupling extension, wherein the hook is disposed adjacent to the bottom edge of the coupling extension.

17. The display assembly of claim 16, wherein the coupling extension is arcuate, and wherein a width of the coupling extension is less than a width of the housing portion.

18. The display assembly of claim 16, wherein the hook has an underside defining a notch configured to engage said vehicle seat.

19. The display assembly of claim 16, wherein the housing portion includes sidewalls and a rim extending from each sidewall, and wherein an obtuse angle is defined between the coupling ledge and the rim adjacent each sidewall.

20. The display assembly of claim 16, wherein an obtuse angle is defined between a top side of the hook and an inner surface of the coupling extension.

* * * * *